(12) United States Patent
Shih

(10) Patent No.: US 6,223,899 B1
(45) Date of Patent: May 1, 2001

(54) TOOL BOX ASSEMBLY HAVING LIGHTING AND WARNING FUNCTIONS

(76) Inventor: Tsai-Chien Shih, PO Box 82-144, Taipei (TW)

( * ) Notice: Subject to any disclaimer, the term of this patent is extended or adjusted under 35 U.S.C. 154(b) by 0 days.

(21) Appl. No.: 09/474,255

(22) Filed: Dec. 29, 1999

(51) Int. Cl.⁷ .................................................. B69D 69/00
(52) U.S. Cl. ......................... 206/573; 206/216; 362/154
(58) Field of Search ................................. 206/216, 372, 206/373, 349, 572, 573, 575; 362/154, 156, 253

(56) References Cited

U.S. PATENT DOCUMENTS

| 5,221,003 | * | 6/1993 | Chang | 206/216 |
| 5,685,421 | * | 11/1997 | Gilmore | 206/216 |
| 5,803,586 | * | 9/1998 | Velez et al. | 362/154 |
| 5,879,072 | * | 3/1999 | Huang | 362/156 |

FOREIGN PATENT DOCUMENTS 296 10 703 U * 10/1996 (DE) .
198 03 754 * 8/1999 (DE) .

* cited by examiner

*Primary Examiner*—David T. Fidei

(57) ABSTRACT

A tool box assembly having lighting and warning functions, including a tool box body having a receiving recess in a central portion of one lateral end thereof, an integrated circuit control device retained in the receiving recess, and a transparent light converging lens fittingly abutting against the receiving recess. The receiving recess has a stepped rim, which is provided with a plurality of retaining posts projecting therefrom and lying in a horizontal state for retaining the light converging lens. A periphery of the light converging lens is provided with a plurality of retaining notches for receiving the retaining posts of the tool box body. Three generally slanting abutting grooves of three different sizes are arranged by order of size between each two retaining notches. The smallest abutting grooves just abut against the retaining posts of the tool box body when the light converging lens is rotated so that the light converging lens is firmly positioning in the receiving recess of the tool box. The integrated circuit control device controls light bulbs or light emitting diodes to emit light to thereby control the same to be all on, flashing, or all off.

1 Claim, 5 Drawing Sheets

TOOL BOX ASSEMBLY HAVING LIGHTING AND WARNING FUNCTIONS

BACKGROUND OF THE INVENTION (a) Field of the Invention

The present invention relates to a tool box assembly having lighting and warning functions, more particularly a tool box assembly including a tool box body having an integrated circuit control device mounted thereon for controlling light bulbs or light emitting diodes to be all on, flashing, or all off, whereby the tool box assembly, in addition to storing tools, can be used as a warning sign or, when the light bulbs or all on, as a lighting device.

(b) Description of the Prior Art

Conventional tool boxes and warning signs have their respective functions. With reference to FIG. 1, a conventional tool box includes upper and lower covers pivotally connected to form a box structure, and can only be used for storing tools. FIG. 2 shows a conventional warning sign for cars, which does not have any other function than as a sign of warning on the road. Besides, the conventional warning sign itself is not a light generating body, and it is provided with reflecting labels for reflecting the light from coming cars. If the light from a coming car is not strong enough, the warning sign cannot be clearly seen, and its warning effect is thus discounted.

Therefore, it is an object of the present invention to provide a tool box assembly having lighting and warning functions, which can obviate and mitigate the above-mentioned drawbacks.

SUMMARY OF THE INVENTION

A primary object of the present invention is to provide a tool box assembly having lighting and warning functions, in which a tool box body has a lateral end provided with a receiving recess. The receiving recess has a stepped rim, which is provided with a plurality of retaining posts projecting therefrom and lying in a horizontal state for retaining the light converging lens. A periphery of the light converging lens is provided with a plurality of retaining notches for receiving the retaining posts of the tool box body. Three generally slanting abutting grooves of three different sizes are arranged by order of size between each two retaining notches. The smallest abutting grooves just abut against the retaining posts of the tool box body when the light converging lens is rotated so that the light converging lens is firmly positioning in the receiving recess of the tool box. The integrated circuit control device controls light bulbs or light emitting diodes to emit light to thereby control the same to be all on, flashing, or all off.

DETAILED DESCRIPTION OF THE PREFERRED EMBODIMENT

Figure 1:
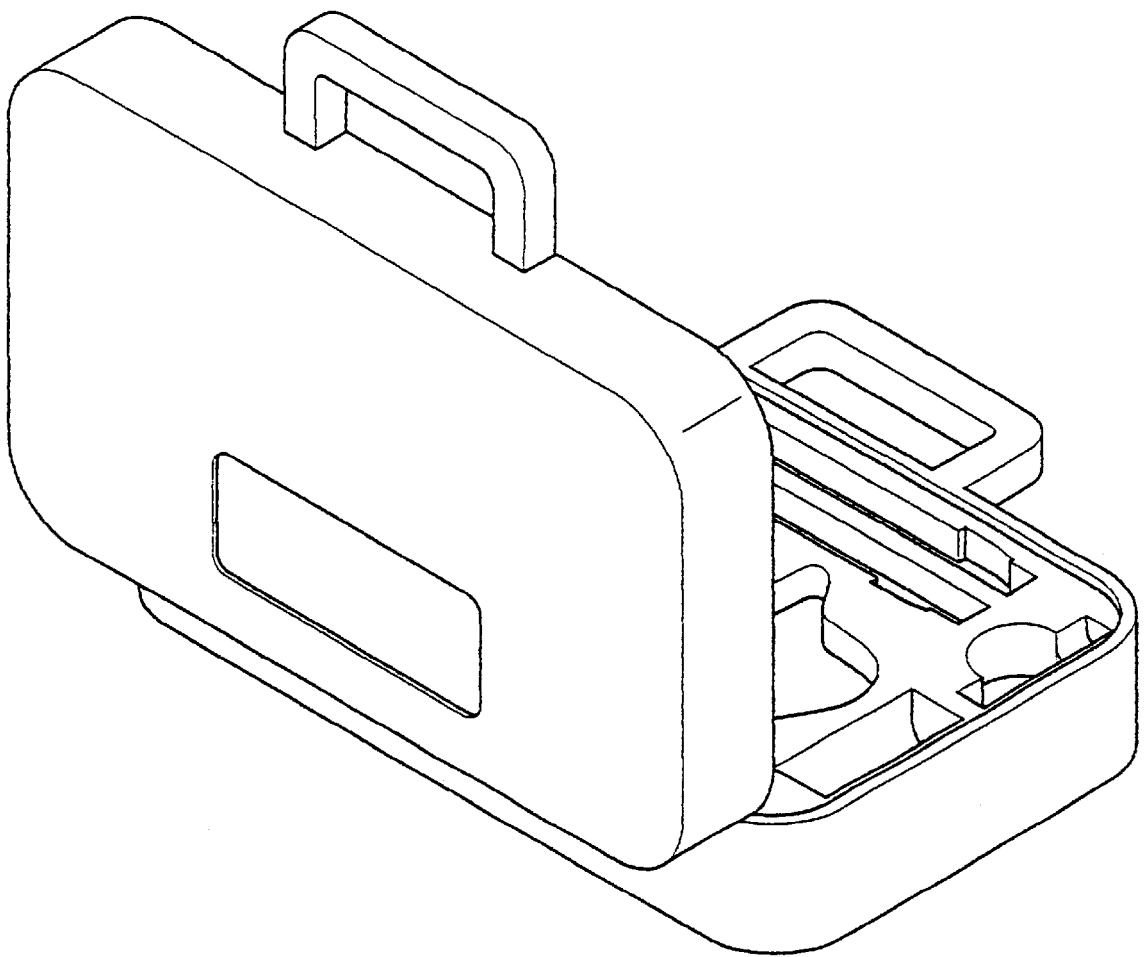
FIG. 1 is a perspective view of a conventional tool box.
Figure 2:
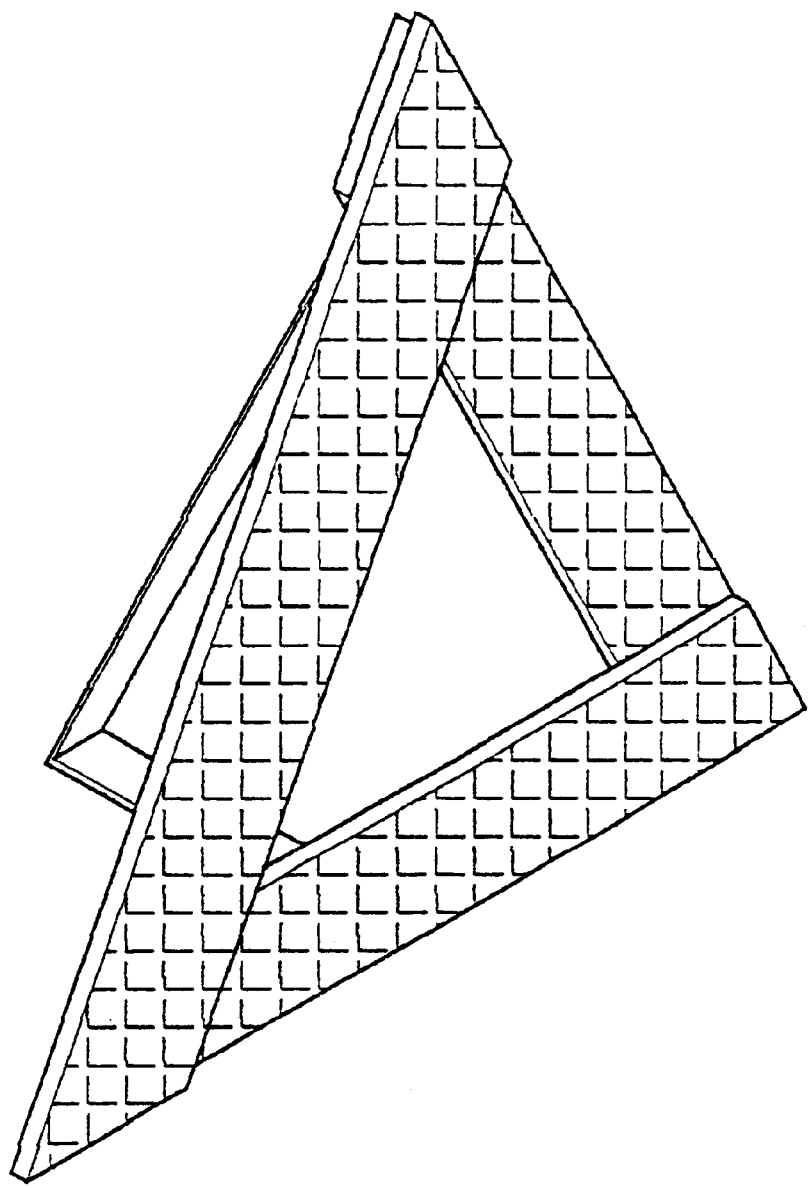
FIG. 2 is an elevational view of a conventional warning sign for cars.
Figure 3:
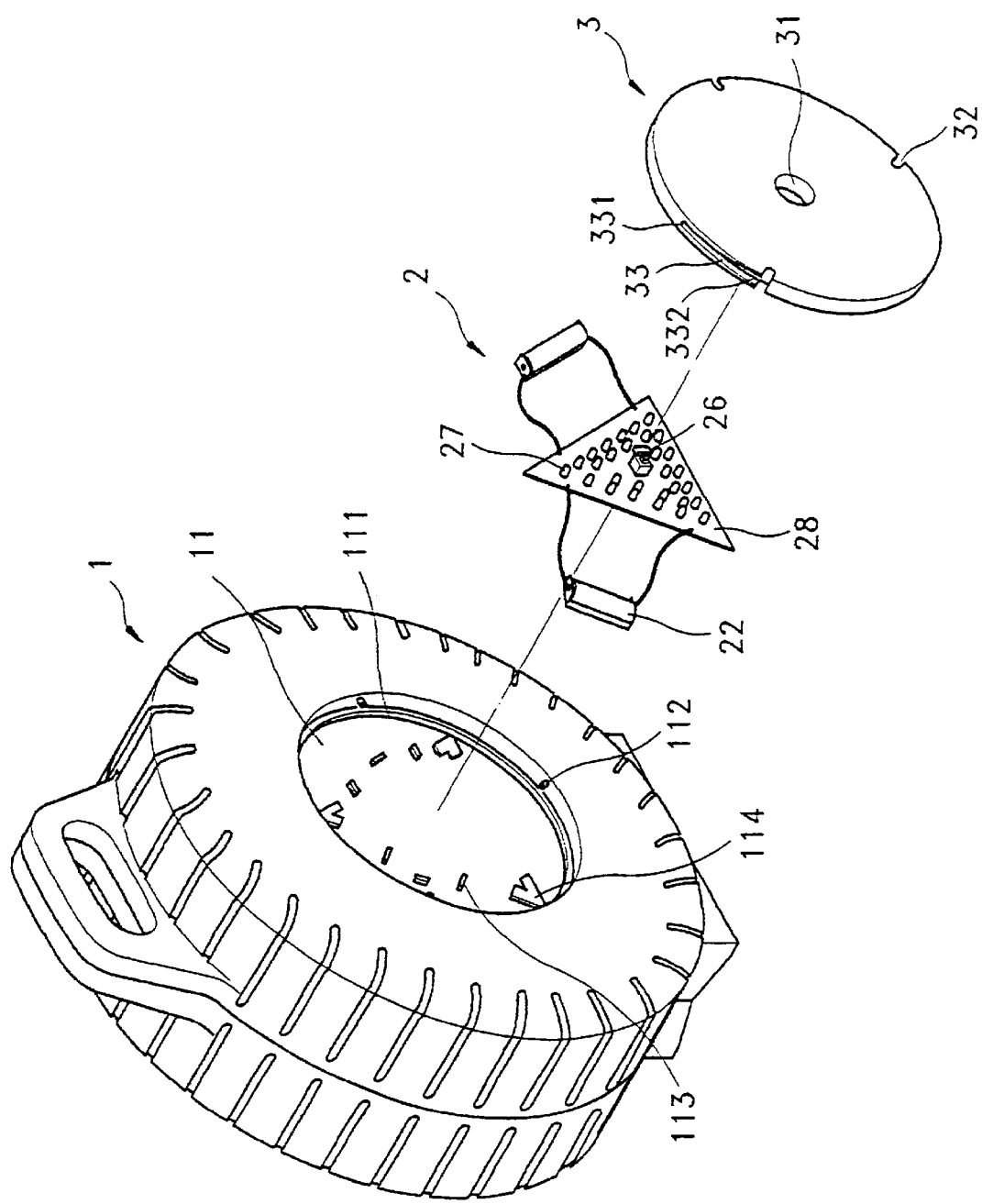
FIG. 3 is an exploded perspective view of the present invention.
Figure 4:
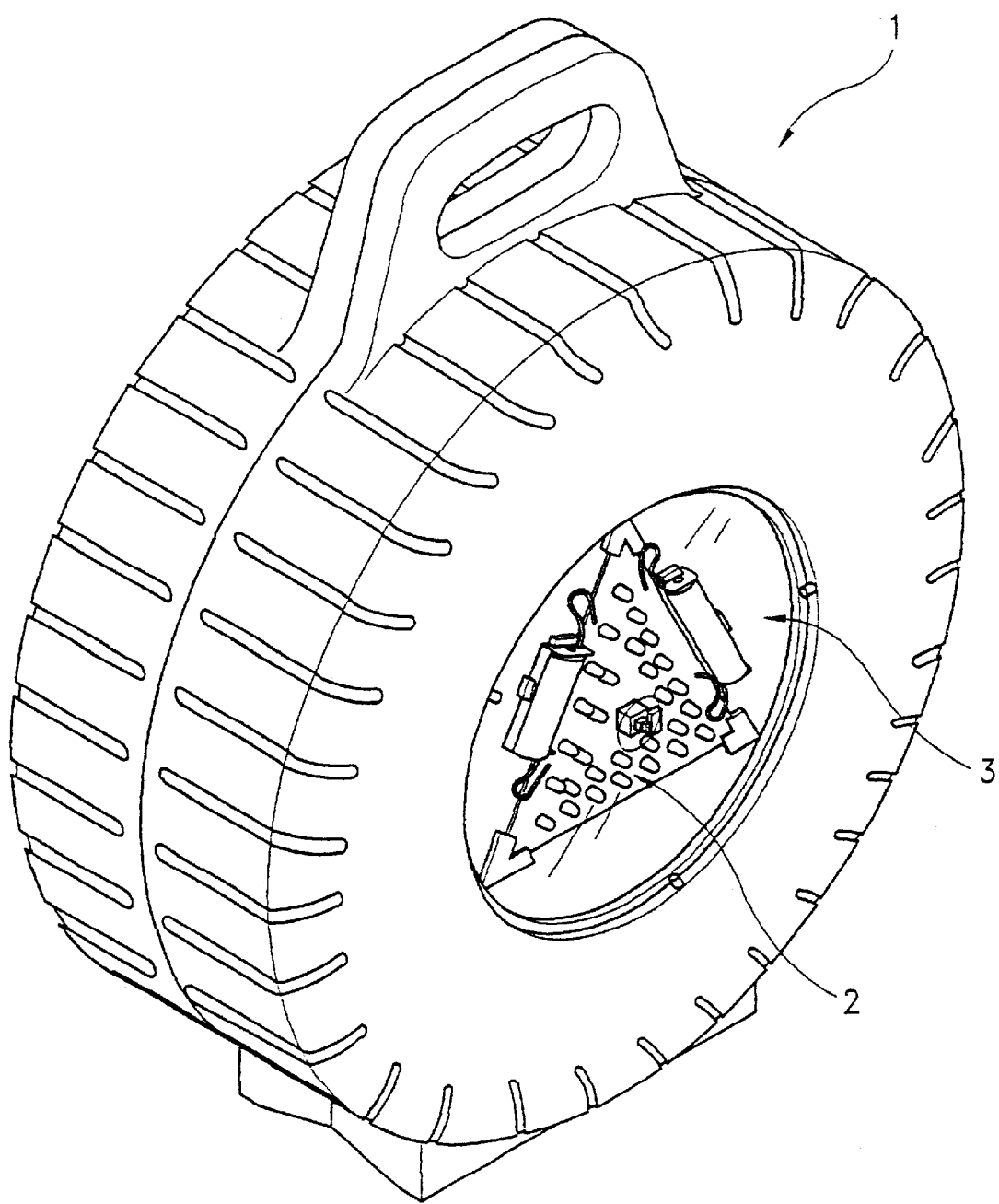
FIG. 4 is an assembled perspective view of the present invention.

With reference to FIGS. 3 and 4, a preferred embodiment of the present invention is shown to comprise a tool box body 1 having a receiving recess 11 in a central portion of one lateral end thereof, an integrated circuit (IC) control device 2 retained in the receiving recess 11, and a transparent light converging lens 3 fittingly abutting against the receiving recess 11.

The receiving recess 11 is circular and has a stepped rim 111. The stepped rim 111 is provided with a plurality of retaining posts 112 projecting therefrom and lying horizontally for retaining the light converging lens 3. The receiving recess 11 is further provided with two projecting retaining bosses 113 to retain a battery 22, and insert grooves 114 around the bosses 113 for receiving the IC control device 2 in the receiving recess 11.

The IC control device 2 includes the above-mentioned battery 22, a transistor 23 communicated with the battery 22, an integrated circuit (IC) board 25 communicated with the transistor via a resistor 24, a control switch 26 communicated with the IC board 25, and light bulbs and light emitting diodes (LED) 27 communicated with the transistor 23 via a loop. The light bulbs and LEDs 27 and the control switch 26 are mounted on a positioning plate 28 and in the center of the positioning plate 28, respectively. The IC board 25 is provided on an inner side of the positioning plate 28 to control the light bulbs and LEDs 27 to emit light. The positioning plate 28 is insertably disposed in the insert grooves 114 of the tool box body 1, with the battery 22 positioned by the retaining bosses 113 of the receiving recess 11.

The light converging lens 3 is centrally provided with a through hole 31 for extension of the control switch 26 therethrough. The periphery of the light converging lens 3 is provided with a plurality of retaining notches 32 for receiving the retaining posts 112 of the tool box body 1. Between each two retaining notches 32 there are provided three generally slanting abutting grooves 33 of three different sizes arranged by order of size. When the light converging lens 3 is rotated, the smallest abutting grooves 331 can just abut against the retaining posts 112 of the tool box body 1.

The positioning plate 28 of the IC control device 2 is positioned in the insert grooves 114 of the tool box body 11. The battery 22 is retained by the retaining bosses 113. The retaining notches 32 of the light converging lens 3 receive the retaining posts 112 at the periphery of the receiving recess 11 such that the posts 112 are located in the largest abutting grooves 332. By rotating the light converging lens 3, the smallest abutting grooves 331 are caused to retain the retaining posts 112, thereby coupling the light converging lens 3 tightly to the tool box body 1.

Figure 5:
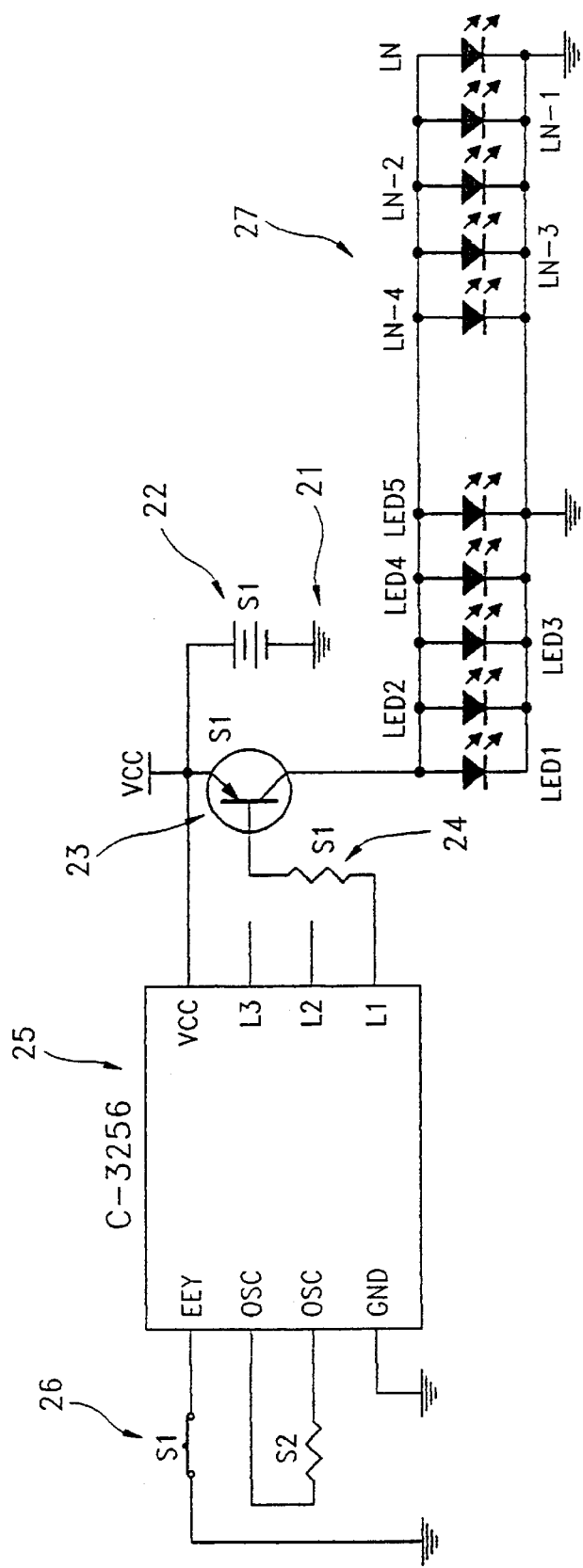
FIG. 5 is a circuit diagram of an integrated circuit control device of the present invention.

The circuitry of the IC control device 2 is illustrated in FIG. 5. The loop is from the battery 22 via the transistor 23 (functioning like a switch) and the resistor to the IC board 25 having a serial number of C-3256. The control switch 26 is pressed to select whether the LEDs or light bulbs 27 are to be all on, flashing, or all off. The loop is connected to the LEDs or light bulbs 27 via the transistor 23 to thereby achieve control of the actions of the light bulbs or LEDs by the IC control device.

In summary, the multi-purpose tool box of the present invention is capable of providing lighting and warning effects other than storing tools necessary for repairing and maintaining a car.

I claim:

1. A tool box assembly having lighting and warning functions, comprising a tool box body having a receiving recess in a central portion of one lateral end thereof, an integrated circuit control device retained in the receiving recess, and a transparent light converging lens fittingly abutting against the receiving recess, wherein the receiving recess has a stepped rim, which is provided with a plurality of retaining posts projecting therefrom and lying in a horizontal state for retaining the light converging lens, the receiving recess being further provided with two projecting retaining bosses to retain a battery, and insert grooves around the bosses for receiving the integrated circuit control device in the receiving recess;

the integrated circuit control device includes the battery, a transistor communicated with the battery, an integrated circuit board communicated with the transistor via a resistor, a control switch communicated with the integrated circuit board, and light bulbs and light emitting diodes electrically connected with the transistor via a loop, the light bulbs and light emitting diodes and the control switch being respectively mounted on a positioning plate and a central portion of the positioning plate, the integrated circuit board being locked to an inner side of the positioning plate to control the light bulbs and light emitting diodes to emit light, the positioning plate being insertable into the insert grooves of the receiving recess of the tool box body, the battery being retained by the retaining bosses on the receiving recess; and the light converging lens is centrally provided with a through hole for extension of the control switch therethrough, a periphery of the light converging lens being provided with a plurality of retaining notches for receiving the retaining posts of the tool box body, three generally slanting abutting grooves of three different sizes being arranged by order of size between each two retaining notches, the smallest abutting grooves just abutting against the retaining posts of the tool box body when the light converging lens is rotated;

whereby a tool box having additional functions of lighting and warning is achieved.

* * * * *